United States Patent [19]
Boden

[11] Patent Number: 5,579,557
[45] Date of Patent: Dec. 3, 1996

[54] TELESCOPIC HANDLE

[75] Inventor: Derek W. Boden, Brighton, Australia

[73] Assignee: Extrusion Facsilities Pty Ltd., Brighton, Australia

[21] Appl. No.: 378,185

[22] Filed: Jan. 25, 1995

[51] Int. Cl.⁶ ..................................... B25G 1/04
[52] U.S. Cl. .............................. 16/115; 15/144.4; 403/109
[58] Field of Search ................... 16/115, 111 R, 16/DIG. 12; 81/177.1, 177.6, 489; 15/144.4; 403/109, 378, 377; 43/18.1

[56] References Cited

U.S. PATENT DOCUMENTS

| | | | |
|---|---|---|---|
| 2,319,992 | 5/1943 | Hubbard | 403/109 |
| 3,596,946 | 8/1971 | Burton | 15/144.4 |
| 4,325,157 | 4/1982 | Balint et al. | |
| 4,376,397 | 3/1983 | Newby et al. | |
| 4,941,232 | 7/1990 | Decker et al. | 16/111 R |
| 5,033,337 | 7/1991 | Thomas, III | |
| 5,193,419 | 3/1993 | Lee | |
| 5,333,968 | 8/1994 | Bauer | 403/377 |
| 5,343,587 | 9/1994 | Findley | 15/144.4 |
| 5,352,057 | 10/1994 | Zody | 403/109 |
| 5,385,323 | 1/1995 | Garelick | 403/109 |

FOREIGN PATENT DOCUMENTS

| | | | |
|---|---|---|---|
| 8544782 | 1/1983 | Australia | |
| 3046286 | 7/1982 | Germany | |
| 208870 | 11/1966 | Sweden | 15/144.4 |

*Primary Examiner*—Chuck Y. Mah
*Attorney, Agent, or Firm*—Loeb & Loeb LLP

[57] ABSTRACT

The invention concerns a telescopic handle having an inner handle member (13) slidably received within a tubular outer handle member (10). Open ended end caps (15, 16) are mounted to ends of the outer member (10). A spring biased catch (17) is mounted to the inner member and button (18) of the catch projects through a selected aperture (11) in the outer member (10) to lock the inner member (13) at a desired extension relative to the outer member (10).

8 Claims, 3 Drawing Sheets

TELESCOPIC HANDLE

BACKGROUND OF THE INVENTION

This invention relates to a telescopic handle. In particular, the invention concerns a telescopic handle to which a concrete finishing tool may be secured.

The invention will be described by way of example with reference to a telescopic handle for a concrete finishing tool. It should be appreciated that the handle may also be used for other purposes.

One known telescopic handle for concrete finishing tools had an outer tubular member which slidably received an inner tubular member within it. The end of the outer member from which the inner member projects had a screw threaded fitting with a rubber clamping ring. With the fitting unlocked the inner member could be moved to its desired degree of extension relative to the outer member. By locking the fitting the ring was firmly clamped against the inner member to lock it in the desired extended position. The degree of extension was thus infinitely variable between a minimum and a maximum extension.

The concreting environment is particularly harsh and contaminants readily affected the efficiency of the clamping arrangement. Formwork used in concreting is usually coated with a release agent and if the agent contacted the rubber ring the locking of the inner and outer members relative to each other was affected and the members could often slip relative to each other.

When the handle and the locking arrangement became contaminated, the handle would need to be disassembled, cleaned and often the rubber ring would need to be replaced.

It is an object of the present invention to provide a telescopic handle which at least minimises the disadvantage referred to above.

SUMMARY OF THE INVENTION

According to one aspect the invention provides a telescopic handle including an outer tubular handle member, an inner handle member slidably received by the outer member, a biased catch co-operable with the members to lock the members relative to each other at desired discrete relative extensions, the outer tubular handle member having a tubular wall with an inner surface and inwardly directed longitudinally extending webs extending from the inner surface and into engagement with the inner handle member for guiding the inner handle member for movement relative to the outer member, the catch locating between two adjacent said webs whereby rotation of the handle members relative to one another is prevented.

Preferably the catch is spring biased. A leaf spring is particularly preferred. The catch may include a projection adapted to engage either the outer or the inner member to lock the members relative to one another. The projection may comprise a button normally biased into engagement with one of the members and movable out of engagement to enable the members to move relative to one another to either extend or retract the handle. The catch may be mounted to either one of the members. Preferably, the catch is mounted to the inner member so that the button extends outwardly of the inner member.

The outer member is preferably substantially circular in transverse cross section. If desired the outer surface of the outer member may be enhanced to provide a more secure gripping surface during use of the handle of the invention. In one embodiment the outer surface is provided with longitudinally extending flutes.

Where the catch is mounted to the inner member, the outer member is provided with a plurality of locating apertures for receiving the button of the catch to thereby lock the two members relative to one another. The apertures may be evenly spaced along the length of the outer member but this is not necessary. Any suitable number of locating apertures may be present but it is preferred that a least four such apertures be provided in the outer member.

The ends of the outer member may be provided with end caps. The transverse cross sectional shape of the end caps may substantially match the cross sectional shape of the centre member. Preferably the end caps have a substantially circular transverse cross sectional shape. The end caps have end walls. Preferably, end walls of both end caps are open. In this way the interior of the handle may be cleaned of contaminants.

The outer member preferably has inwardly directed locating abutments. The abutments serve to locate the inner member with its outer surface spaced from the inner surface of the outer member and function as stand offs or spacers. In addition, two spaced abutments may act as a guide for the catch to ensure that, when the members are circular in transverse shape, relative rotation or radial displacement of the members does not occur.

The inner member may preferably be tubular although, if the catch is mounted to the outer member, the inner member may be solid in its construction. When the catch is mounted to the inner member the spring may be contained within the member. A concrete finishing tool or head may be mounted to that end of the inner member which projects from the outer member.

BRIEF DESCRIPTION OF THE DRAWINGS

A particular preferred embodiment of the invention will now be described by way of example with reference to the drawings in which.

DETAILED DESCRIPTION OF THE PREFERRED EMBODIMENTS

Figure 1:
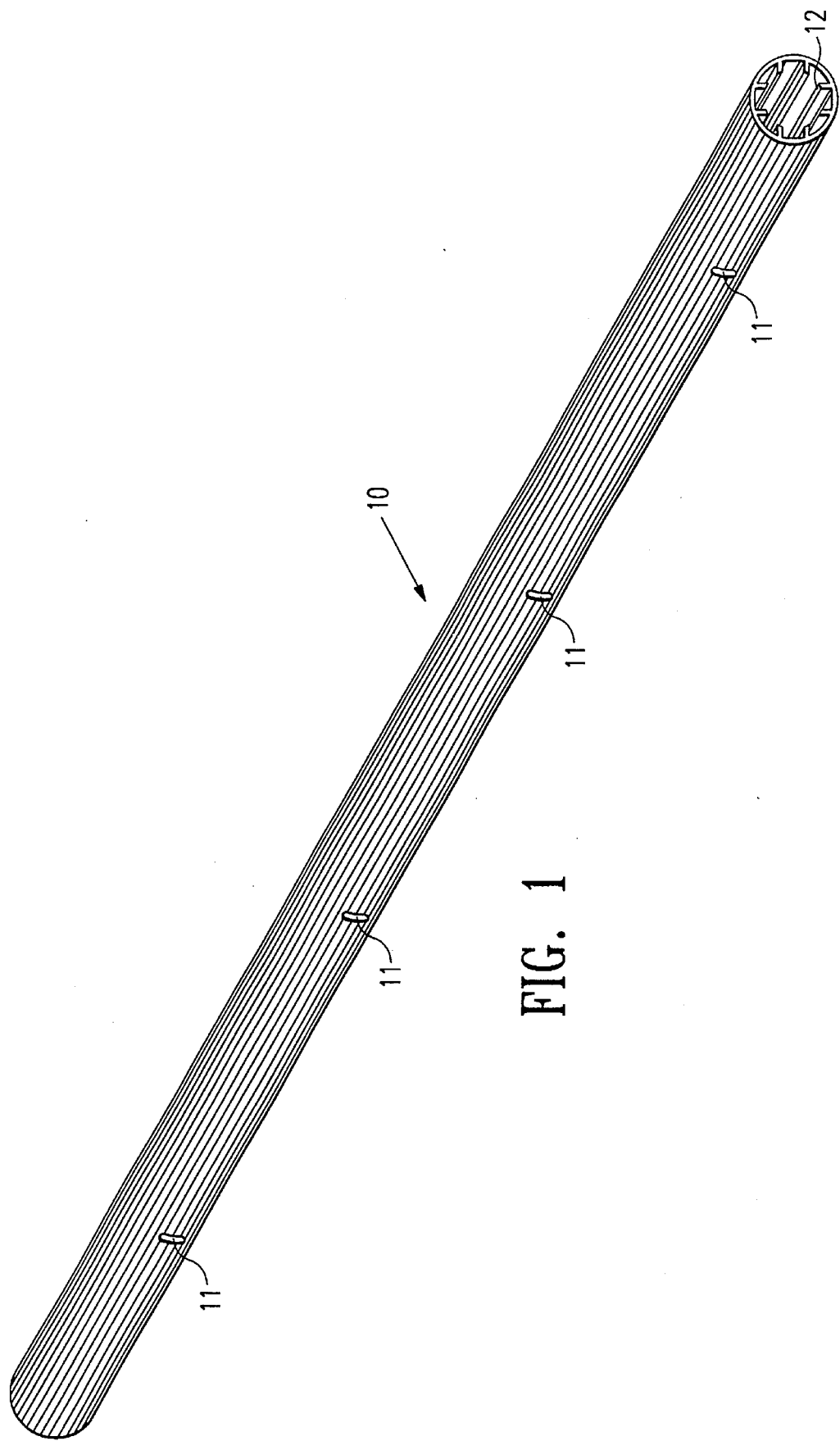
FIG. 1 is a perspective view of an outer member of the handle of the invention.
Figure 4:
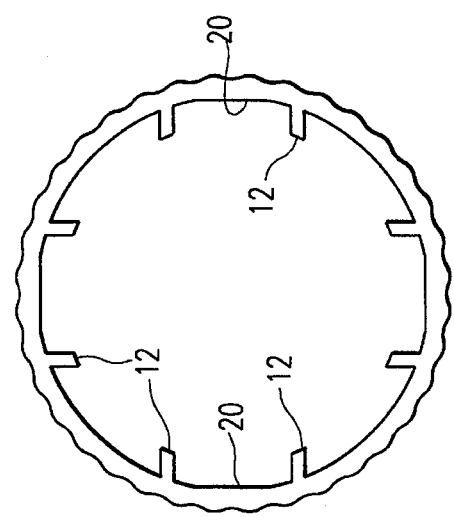
FIG. 4 is a transverse sectional view of an outer member of the handle.

The outer member 10 shown in FIG. 1 is tubular and substantially circular in transverse cross sectional shape. A plurality of locating apertures 11 are present at equal intervals along its length. The interior of the member 10 has a series of inwardly directed webs or stand offs 12 best seen in FIG. 4. Webs extend along the length of the member 10 and abut an inner member 13 (see FIG. 4) to space it from the interior wall of member 10 and to guide it for sliding movement relative thereto.

Figure 2:
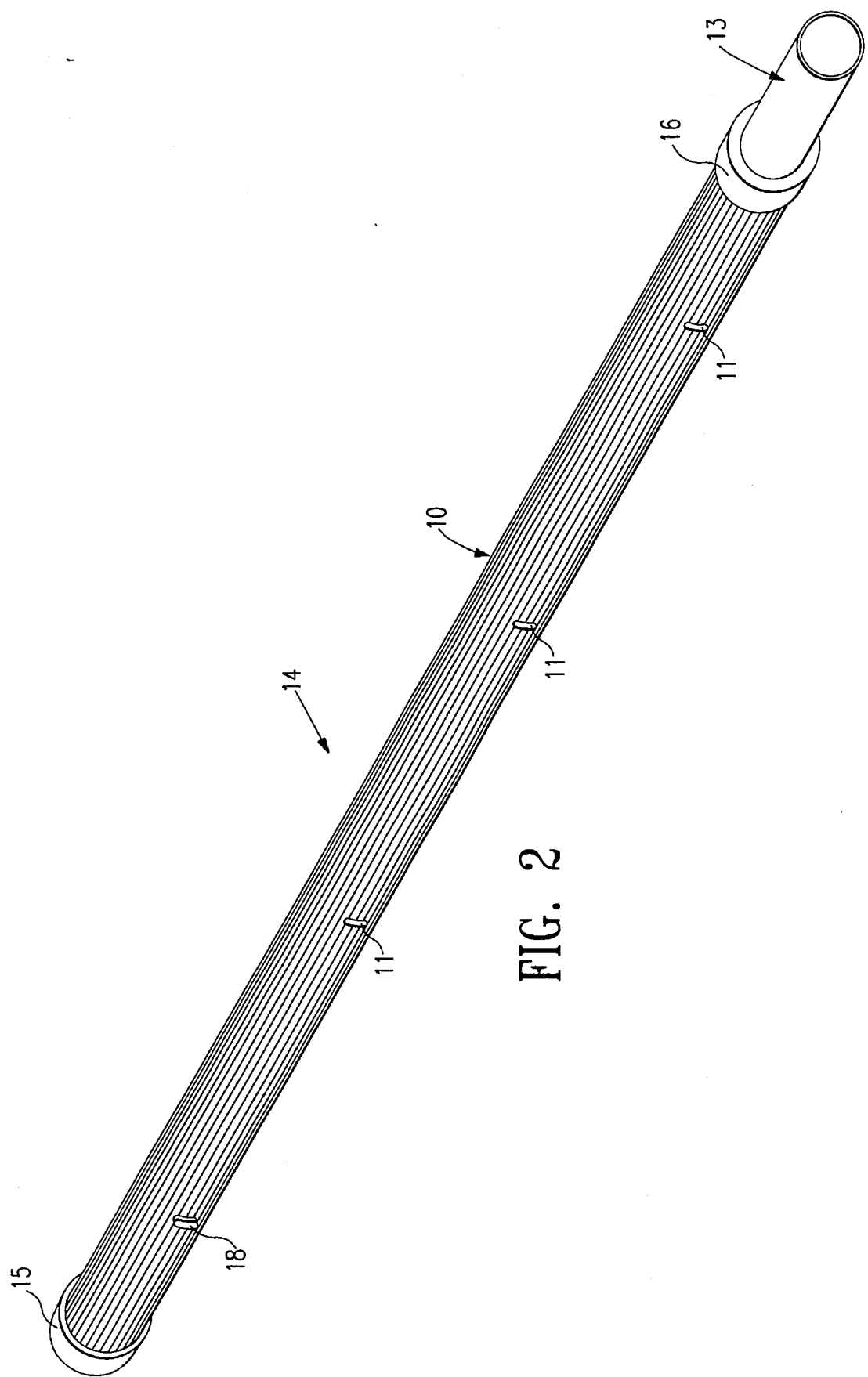
FIG. 2 is a perspective view of a handle according to an embodiment of the invention.
Figure 3:
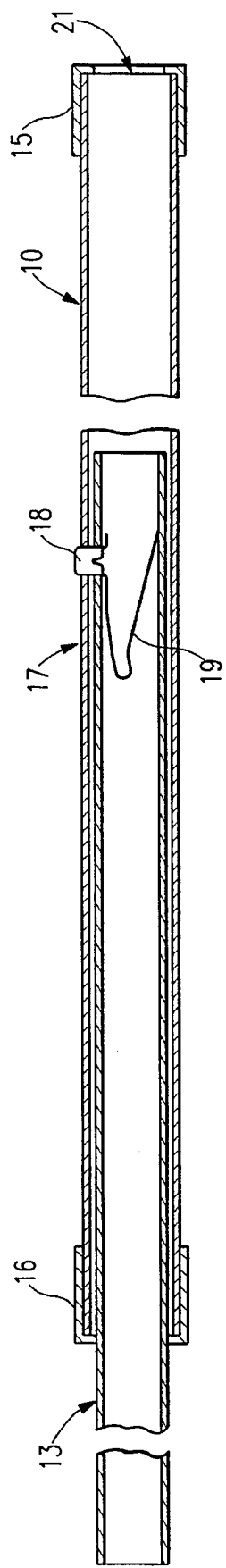
FIG. 3 is a longitudinal sectional view of the handle of FIG. 2.

FIGS. 2 and 3 show a handle 14 in accordance with an embodiment of the invention. Outer member 10 has end caps 15, 16 secured to it in any suitable manner. Inner member 13 is received within member 10 and is shown in its fully retracted position. A biased catch 17 is mounted to member 13 and has a button 18 and a spring 19. The spring 19 extends from button 18 and engages the inner surface of member 13 to bias the button into a selected aperture of the member 10. Webs 12 (see FIG. 4) ensure that there is a gap between members 10 and 13. To extend the inner member 13, the button 18 is depressed and the members may slide relative to one another until the button locates within an adjacent aperture 11. Retraction of the inner member requires the button to be depressed and the inner member to be moved into the outer member. End caps 15 and 16 have open ends 21 to enable the interior of the handle to be cleaned without assembly being necessary. However, if desired the button may be depressed and the inner member passed through open end 21 and removed from the outer member. In this way the handle may be disassembled if desired.

Portion 20 between the two pairs of webs 12 are flat and together with the adjacent webs act as a guide for the catch and prevent relative radial rotation of the members 10, 13. In this way button 18 will easily locate in a desired aperture 11.

Figure 5:
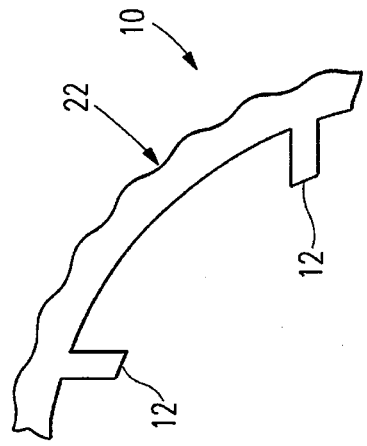
FIG. 5 is a fragmentary detailed view of portion A of FIG. 4.

As shown in FIG. 5, the exterior of the outer member 10 is provided with flutes 22 to provide the user with a better grip.

I claim:

1. A telescopic handle including:

an outer tubular handle member, an inner tubular handle member slidably received by the outer tubular handle member, a biased catch co-operable with the inner and outer tubular handle members to lock the inner and outer tubular handle members relative to each other at desired discrete relative extensions, wherein the outer tubular handle member has a tubular wall with an inner surface and inwardly directed longitudinally extending webs extending from the inner surface and into engagement with the inner tubular handle member for guiding the inner handle member for longitudinal movement relative to the outer tubular handle member, wherein the catch is located between two adjacent said webs, and wherein the webs prevent rotational movement of the catch such that rotation of the inner and outer tubular handle members relative to one another is prevented.

2. The handle of claim 1, wherein the catch is spring biased and includes a projection adapted to engage one of the tubular handle members.

3. The handle of claim 2, wherein the projection comprises a button adapted to engage the one of the tubular handle members.

4. The handle of claim 3, wherein the catch is mounted to the inner tubular handle member and the outer tubular handle member has a plurality of locating apertures along its length and the button is receivable in a desired one of the locating apertures.

5. The handle of claim 1, wherein the inner and the outer tubular handle members are substantially circular in transverse cross section.

6. The handle of claim 1, including end caps mounted to ends of the outer tubular handle member.

7. The handle of claim 6, wherein the end caps have open end walls.

8. The handle of claim 1, including longitudinally extending flutes on an exterior surface of the outer tubular handle member.

* * * * *